(12) United States Patent
Isley et al.

(10) Patent No.: US 7,997,309 B2
(45) Date of Patent: Aug. 16, 2011

(54) SYSTEM AND METHOD FOR MEASURING TREES DURING PROCESSING

(75) Inventors: Reggald Emory Isley, Grande Prairie (CA); Peter Stegmeier, Grande Prairie (CA)

(73) Assignee: Risley Enterprises Ltd., Grande Prairie (CA)

( * ) Notice: Subject to any disclaimer, the term of this patent is extended or adjusted under 35 U.S.C. 154(b) by 587 days.

(21) Appl. No.: 11/565,548

(22) Filed: Nov. 30, 2006

(65) Prior Publication Data

US 2008/0128051 A1    Jun. 5, 2008

(51) Int. Cl.
*A01G 23/095*    (2006.01)
*B23Q 15/00*    (2006.01)

(52) U.S. Cl. .................. 144/24.13; 144/357

(58) Field of Classification Search ........... 144/4.1, 144/24.13, 34.1, 382, 391, 392, 393, 394, 144/402, 403, 404; 30/166.3, 173, 175, 180, 30/194, 228
See application file for complete search history.

(56) References Cited

U.S. PATENT DOCUMENTS

| | | | | |
|---|---|---|---|---|
| 3,720,247 A | * | 3/1973 | Lindblom | 144/4.1 |
| 4,250,935 A | * | 2/1981 | Helgesson et al. | 144/343 |
| 4,382,457 A | * | 5/1983 | Hahn | 144/24.13 |
| 4,537,236 A | * | 8/1985 | Kulju | 144/336 |
| 4,919,175 A | * | 4/1990 | Samson | 144/24.13 |
| 4,984,961 A | * | 1/1991 | Herolf | 414/812 |
| 5,058,638 A | * | 10/1991 | Hacker et al. | 144/4.1 |
| 5,148,843 A | * | 9/1992 | Cote | 144/24.13 |
| 5,628,354 A | | 5/1997 | Kingston | |
| 5,704,407 A | * | 1/1998 | Hamby, Jr. | 144/24.13 |
| 5,865,229 A | * | 2/1999 | Unosen | 144/4.1 |
| 6,318,425 B1 | * | 11/2001 | Niemi | 144/343 |
| 6,371,177 B1 | * | 4/2002 | Larente | 144/24.13 |
| 6,431,232 B1 | | 8/2002 | Seymour | |
| 6,550,506 B1 | | 4/2003 | Levesque et al. | |
| 6,575,210 B1 | * | 6/2003 | Dye | 144/24.13 |
| 6,962,178 B2 | * | 11/2005 | Duval | 144/3.1 |
| 2004/0074563 A1 | * | 4/2004 | MacNeil et al. | 144/335 |
| 2004/0112466 A1 | * | 6/2004 | Roth et al. | 144/336 |

FOREIGN PATENT DOCUMENTS

| WO | WO 2005043983 A1 | * | 5/2005 |
|---|---|---|---|
| WO | WO 2006092469 A1 | * | 9/2006 |

* cited by examiner

*Primary Examiner* — David J. Walczak
*Assistant Examiner* — Jennifer Chiang
(74) *Attorney, Agent, or Firm* — Oyen Wiggs Green & Mutala LLP

(57) ABSTRACT

A system for measuring the length of a tree being processed through a delimber including a log feed roller mechanism for moving the tree, a delimbing head for delimbing the tree that is movable in a forward and reverse direction relative to the log feed roller mechanism, a measuring wheel resiliently mounted on the delimbing head, and a trimsaw movably mounted on the delimbing head. The length of the processed tree extending beyond the delimbing head may be calculated from signals encoded by the log feed roller mechanism and the measuring wheel. Logs may be cut from the tree by the trimsaw. Two photosensors located at known positions may be used to calculate the total length of the tree.

11 Claims, 6 Drawing Sheets

SYSTEM AND METHOD FOR MEASURING TREES DURING PROCESSING

TECHNICAL FIELD

This invention relates to methods and apparatus for determining the lengths of logs, and in particular to methods and apparatus for determining the lengths of logs being processed by tree-handling equipment such as tree delimbers.

BACKGROUND

Delimbing machines for removing the limbs from felled trees are well known in the logging industry. One type of delimbing machine is a stroke-type delimber, such as the LIM-MIT® stroke tree delimber manufactured by Risley Equipment Ltd. of Grande Prairie, Alberta, Canada.

It is often desirable to provide in combination with a delimbing machine means for cutting delimbed trees into lengths in order to facilitate transport and processing. Delimbing machines may be provided with cut-off saws to cut logs into desired lengths while the logs are being delimbed. For example, U.S. Pat. No. 5,628,354 issued to Kingston discloses a tree processor attachment for log porters that is capable of delimbing and severing a tree. This processor attachment includes a trunk advancing and delimbing portion guided in a reciprocal longitudinal movement by a rectangular boom. Movement of the boom is controlled by a hydraulic cylinder with a stroke length of 50 inches, which allows logs to be measured in multiples of 50 inches. A saw blade is used to cut a log from the tree being delimbed once the selected length is reached.

U.S. Pat. No. 6,550,506 issued to Levesque et al. discloses a delimber that uses a butt plate at one end of a boom assembly to determine the length of a log to be cut. Feed rollers feed the delimbed tree until it hits the butt plate, at which point a cut-off saw on the delimbing head cuts a log from the tree being delimbed. This delimber may include a plurality of butt plates located at different predetermined distances from the cut-off saw to allow different lengths of log to be cut from the tree being delimbed. This device suffers from the disadvantage that only logs of pre-determined lengths may be cut, and the maximum log length is restricted to the distance between the cut-off saw and the farthest-placed butt plate.

The '506 patent also discloses a boom assembly without butt plates, in which measuring roller means may be used on the delimber boom to measure the length of delimbed tree emerging from the delimbing head. A log of the desired length is then cut using a cut-off saw. This technique is slow because it relies on the drive mechanism of the boom to advance the delimbed tree. This technique also lacks a means to accurately locate the butt of the log and retain it firmly to ensure that movement is not possible. Any slippage of the log results in inaccurate measurements.

U.S. Pat. No. 6,431,232 issued to Seymour describes a delimber wherein a gripping device mounted to a frame holds the butt end of a tree to be delimbed, while a delimbing carriage movably mounted to the frame traverses the length of the frame to strip limbs from the tree. A saw box including a saw chain is mounted to the delimbing carriage, allowing the tree to be cut into logs of different lengths. The log can be cut to a desired length by translating the movement of the delimbing carriage from the gripping device into a length. The speed of this technique limited to the speed of the drive mechanism of the delimbing carriage. The delimbing carriage must first move to the tip of the tree, removing limbs on the way, then measure back to the first cut, and so forth for trees cut multiple times. Alternatively, after the first cut is made, the remainder of the tree must be picked up and repositioned for the second cut on trees cut multiple times.

There remains a need for cost-effective and reliable means for measuring the lengths of trees being delimbed. There remains a particular need for stroke-type delimbers which include reliable mechanisms for measuring tree length.

SUMMARY

The following embodiments and aspects thereof are described and illustrated in conjunction with systems, tools and methods which are meant to be exemplary and illustrative, not limiting in scope.

One aspect of the invention provides a system for measuring the length of a tree being delimbed on a delimber. The system comprises: a delimbing head mounted proximate the free end of a slidably displaceable member; a measuring wheel resiliently mounted on the delimbing head; a log feed roller mechanism comprising two rollers positioned so as to move the tree through the delimbing head; a tree-cutting device positioned so as to cut a length from the tree coupled to the delimbing head; a first tree-sensing mechanism positioned in a tree guide tube of the delimber; and a data processing device to calculate lengths of the tree based on input encoded by the measuring wheel, the log feed roller mechanism, the slidably displaceable member, and the first tree-sensing mechanism.

The tree length measuring system may comprise a second tree-sensing mechanism positioned in the tree guide tube at a greater distance from the log feed roller mechanism than the first tree-sensing mechanism. The first and second tree-sensing mechanisms may respectively comprise a photo eye.

The tree length measuring system may also comprise a biasing mechanism which provides a resilient force to maintain contact between an outer surface of the tree and the measuring wheel.

The tree length measuring system may further comprise means for measuring a first diameter of the tree at a position located at the log feed roller mechanism and a second diameter of the tree at a position located at delimbing knives on the delimbing head.

The data processing device of the tree length measuring system may be adapted to calculate:
  the length by which the tree extends beyond the tree-cutting device based on input encoded by the measuring wheel, the log feed roller mechanism, and the slidably displaceable member;
  the length of the tree that remains on the delimber when the butt end of the tree reaches the log feed roller mechanism by subtracting the length of logs already cut from the tree from the total length of the tree.
  the total length of the tree based on input encoded by the measuring wheel, the log feed roller mechanism, the slidably displaceable member, and either the first or second tree-sensing mechanism; and/or
  the most efficient lengths of logs to be cut from the tree based on the measurement of the total length of the tree;

Another aspect of the invention provides a system for measuring the length of a tree being delimbed on a delimber. The system comprises: means for displacing a delimbing head in a forward and reverse direction with respect to the trunk of the tree; a measuring wheel means resiliently mounted to the delimbing head for measuring the distance traveled by the delimbing head relative to the trunk of the tree; a log feed roller means for moving the tree through the delimbing head; tree-cutting means adapted to cut a log from the tree coupled to the delimbing head; a first means for sensing a tree in a tree guide tube of the delimber; and data processing means to calculate lengths of the tree based on input encoded by the measuring wheel means, the log feed roller means, the delimbing head displacing means, and the first tree sensing means. The system may comprise a second means for sensing a tree in the tree guide tube of the delimber, wherein the second tree-sensing means is positioned at a greater distance from the log feed roller mechanism than the first tree-sensing means.

A further aspect of the invention provides a method for measuring lengths of a tree being delimbed on a delimber. The method comprising the following steps: providing an apparatus having a delimbing head adapted to remove branches of the tree positioned on a slidably displaceable member; providing a log feed roller mechanism to feed the tree through the delimbing head; providing a tree-cutting device adapted to cut a log from the tree positioned on the delimbing head; providing a measuring wheel resiliently mounted to the delimbing head so as to contact the tree; providing a first tree-sensing mechanism positioned to sense the presence of the tree within a tree guide tube of the delimber; and providing a data processing device to calculate lengths of the tree based on input encoded by the measuring wheel, the log feed roller mechanism, the slidably displaceable member, and the tree sensing mechanism.

The tree length measuring method may also comprise providing a second tree-sensing mechanism within the tree guide tube of the delimber at a greater distance from the log feed roller mechanism than the first tree-sensing mechanism.

The tree length measuring method may further comprise moving the delimbing head in a forward or reverse direction with respect to the tree; moving the tree through the delimbing head in a rearwards direction by use of the log feed roller means, thereby causing the tree to be delimbed; and using the data processing device to calculate the total length of the tree based on the input encoded by the measuring wheel, the log feed roller mechanism, the slidably displaceable member, and either the first or second tree-sensing mechanisms.

The tree length measuring method may further comprise moving the tree through the delimbing head in a forwards direction by use of the log feed roller means; using the data processing device to calculate the length by which the tree has been extended beyond the tree-cutting device; and activating the tree-cutting device to cut a log of a desired length from the tree. Extending a desired length of the tree relative to the tree-cutting device and cutting a log of the desired length from the tree may be repeated one or more times.

The tree length measuring method may further comprise using the data processor to calculate:
  the length of the tree remaining in the delimber when the butt of the tree reaches the log feed roller means by subtracting the lengths of logs already cut from the tree from the total length of the tree; and
  the optimum length of logs to be cut from the tree, based on the total length of the tree.

The tree length measuring method may further comprise using a pre-defined model of diameter-to-length ratios of trees to extrapolate the length of the tree based on the measurement of a first diameter of the tree at a position located at the log feed roller mechanism and a second diameter of the tree at a position located at delimbing knives on the delimbing head. The extrapolated length may be used to confirm that the length measured by the measuring wheel is correct.

The length of the tree, a measured value of a first diameter of the tree at a position located at the log feed roller mechanism, and a measured value of a second diameter of the tree at a position located at delimbing knives on the delimbing head may also be used to calculate the volume of the tree processed by the delimber.

In addition to the exemplary aspects and embodiments described above, further aspects and embodiments will become apparent by reference to the drawings and by study of the following detailed descriptions.

BRIEF DESCRIPTION OF THE DRAWINGS

The appended drawings illustrate non-limiting embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
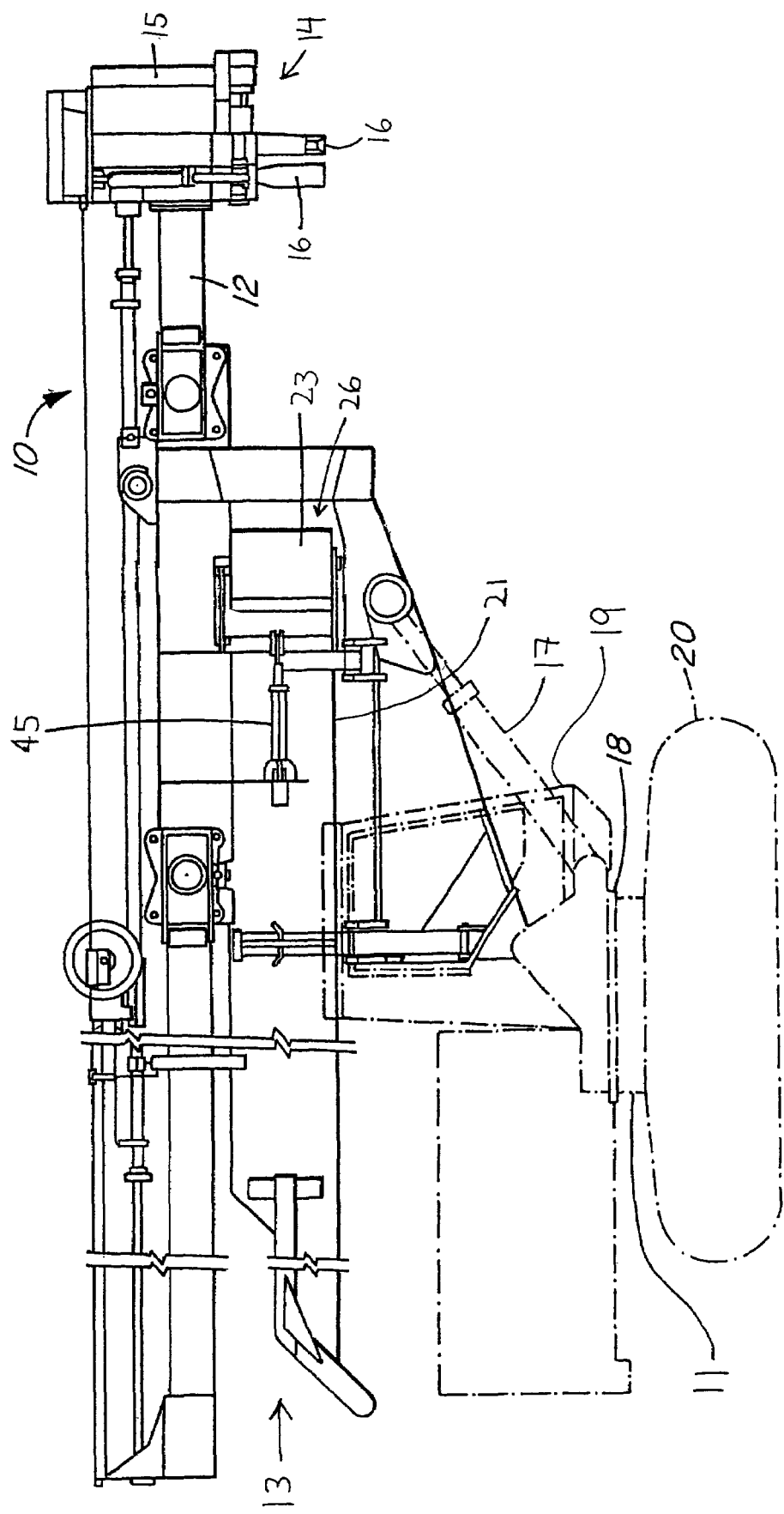
FIG. 1 is a side elevation view of a known stroke-type delimber.

FIG. 1 shows a stroke-type delimber 10 comprising a boom 12 slidably mounted to a superstructure 13. Boom 12 is pivotally mounted to superstructure 13. An angle of tilt of boom 12 can be varied by operating tilt cylinders 17. Superstructure 13 is connected to a cab 19 mounted on a turntable 18. Turntable 18 is mounted on a base 11 with treads 20 that may be driven in conventional fashion to propel delimber 10 to felled trees that are to be delimbed. A delimbing head 14 is mounted at the free end of boom 12, and tree grapples 16 and trimsaw 15 are mounted on delimbing head 14. Tree grapples 16 include delimbing knives (not shown). Trimsaw 15 is positioned such that it may be used to cut a log of a desired length from a tree being delimbed. A log feed roller mechanism 26 comprising log feed rollers 23 and 25 (not shown) may be operated to move a tree through delimbing head 14.

Log feed rollers 23 and 25 can be forced to move toward one another by actuators 45 (hydraulic cylinders in the illustrated embodiment). Actuators 45 may also be operated to move feed rollers 23, 25 apart to receive a tree between feed rollers 23 and 25.

To operate delimber 10, tree grapples 16 are closed around the trunk of a tree to be delimbed. Tree grapples 16 pick up the tree near the butt (base) of tree. Boom 12 is retracted to pull the butt of the tree toward log feed roller mechanism 26. Log feed roller mechanism 26 is opened to receive the butt, and is then closed to grip the tree between rollers 23 and 25.

An operator can cause feed rollers 23 and 25 to counter-rotate and to thereby feed the tree rearwardly into a tree guide tube 21. As used herein, "rearward" and "rearwardly" refer to the direction away from the free end of boom 12, and "forward" and "forwardly" refer to the direction toward the free end of boom 12. An operator can also extend or retract boom 12 to move delimbing head 14 along the tree while the tree is held between feed rollers 23 and 25. By a combination of these movements, the tree is delimbed as its limbs pass through delimbing head 14 and are sheared off by the delimbing knives of grapples 16.

Figure 2:
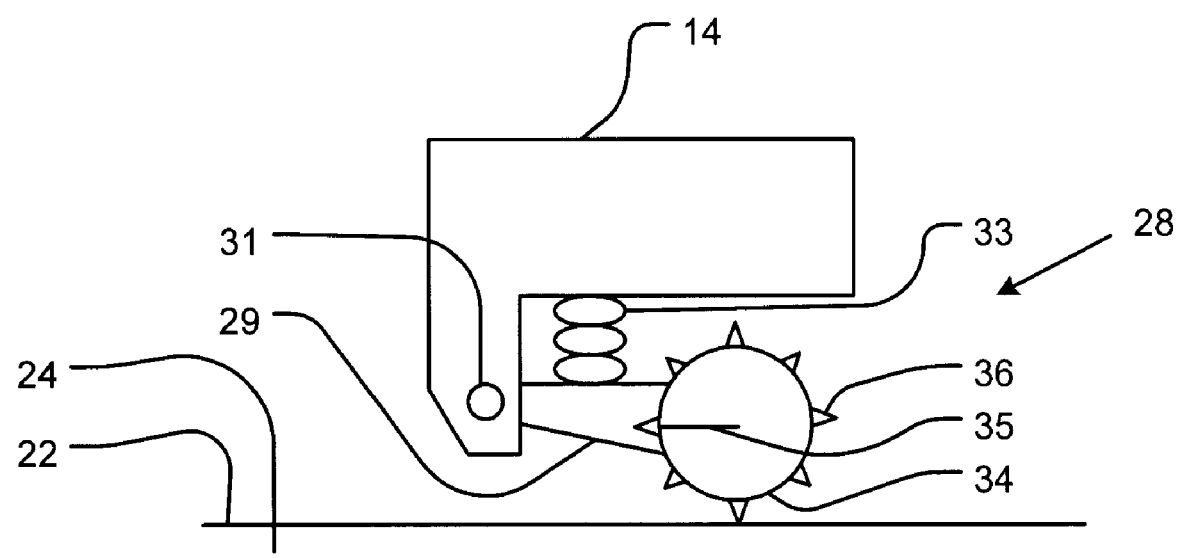
FIG. 2 is a side elevation schematic view of a measuring wheel assembly according to one embodiment of the invention.

As shown in FIG. 2, a measuring wheel assembly 28 is mounted to delimbing head 14. Measuring wheel 34 contacts an outer surface 22 of a tree 24. Outer surface 22 of tree 24 may contain features that render it uneven, and the diameter of tree 24 may vary along the length of tree 24. Therefore, measuring wheel assembly 28 is coupled to delimbing head 14 by resilient suspension, as described below, to allow measuring wheel 34 to continuously make contact with outer surface 22 while tree 24 is being processed through delimbing head 14.

In the embodiment illustrated in FIG. 2, measuring wheel assembly 28 includes a cantilever beam 29 which couples measuring wheel 34 to delimbing head 14. Beam 29 may be pivotally connected to a fixed point 31 on delimbing head 14. Biasing means 33 biases measuring wheel 34 into contact with tree 24 as the tree 24 is moved through the delimbing knives of grapple 16. The delimbing knives of grapple 16 maintain tree 24 against delimbing head 14 so that tree 24 remains in contact with wheel 34. Biasing means 33 of the embodiment shown in FIG. 2 is an air spring. Pressure in the air spring may be adjusted to accommodate different types of trees and environmental conditions.

In an alternative embodiment, measuring wheel assembly 28 may comprise two wheels aligned one in front of the other, similar to a trunnion style suspension. When one of the wheels lifts it tilts the trunnion providing a downward force on the other wheel. The wheels may be kept in contact with tree 24 by biasing means 33.

In yet another embodiment, measuring wheel assembly 28 may comprise biasing means 33 arranged to force wheel 34 along a sliding track system. The sliding track system may act in a linear, circular or elliptical manner, for example, to retain contact between wheel 34 and tree 24.

Measuring wheel 34 is generally circular and has a radius 35. Measuring wheel 34 is positioned to contact outer surface 22 of tree 24 when tree 24 is being processed by delimbing head 14. The outer circumferential edge of measuring wheel 34 is adapted to roll without slipping along outer surface 22. To achieve this, measuring wheel 34 may include gripping features 36 to enable measuring wheel 34 to grip outer surface 22 of tree 24. In the embodiment illustrated in FIG. 2, gripping features 36 comprise small spikes on the circumferential edge of measuring wheel 34. As tree 24 is moved relative to delimbing head 14, measuring wheel 34 rolls without slipping along outer surface 22 of tree 24.

Figure 3A:
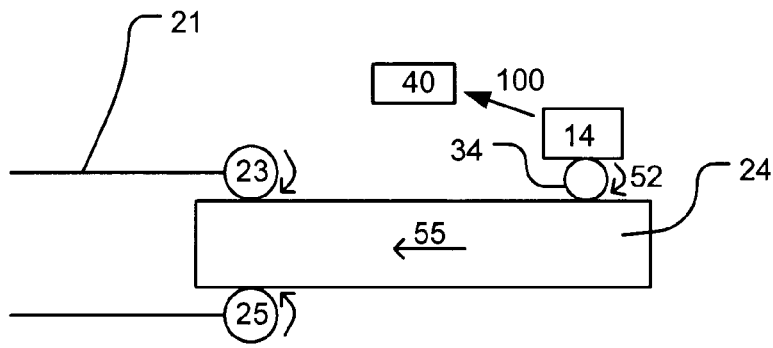
FIGS. 3A to 3D are schematic diagrams illustrating the rotation of a measuring wheel relative to movements of other components of the delimber.
Figure 3B:
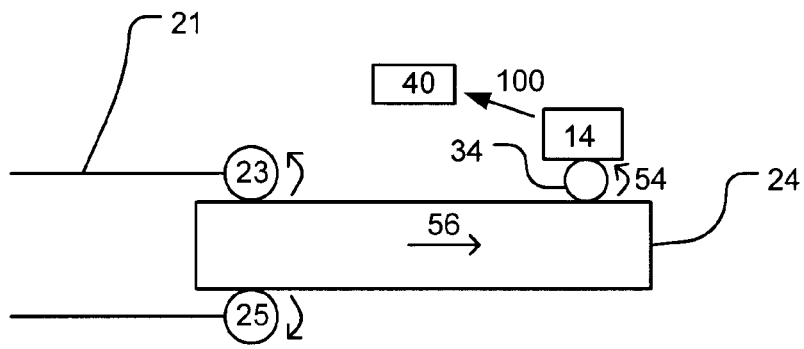
Figure 3C:
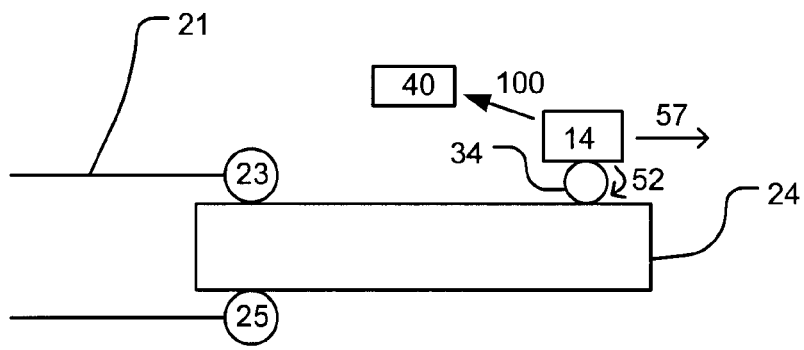
Figure 3D:
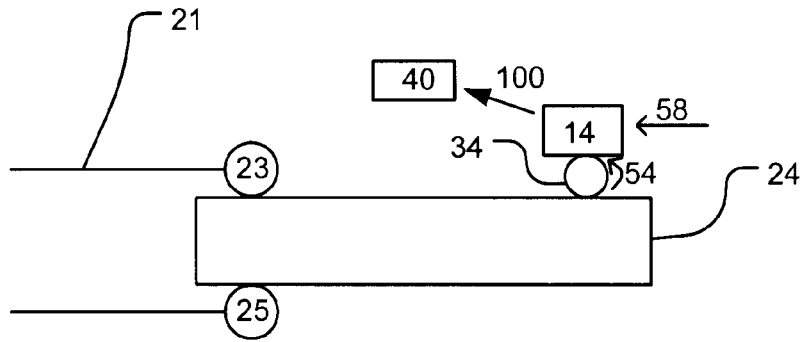

With reference to FIGS. 3A to 3D, rotation of measuring wheel 34 encodes signals 100 that are delivered to a data processor 40. Measuring wheel 34 may rotate in the clockwise direction, indicated by arrow 52, or in the counterclockwise direction, indicated by arrow 54. Measuring wheel 34 rotates clockwise (as shown in FIG. 3A) when tree 24 is being fed in the rearward direction, indicated by arrow 55, into tree guide tube 21, and measuring wheel 34 rotates counter-clockwise (as shown in FIG. 3B) when tree 24 is being passed in the forward direction, indicated by arrow 56, through delimbing head 14. Similarly, extension of boom 12, in the direction indicated by arrow 57, while tree 24 is gripped between feed rollers 23 and 25 results in measuring wheel 34 being rotated clockwise (as shown in FIG. 3C), and retraction of boom 12, in the direction indicated by arrow 58, results in measuring wheel 34 being rotated counterclockwise (as shown in FIG. 3D).

The direction in which measuring wheel 34 is rotating may be ascertained from the direction of movement of tree 24 with respect to delimbing head 14. This direction can be determined by data processor 40 based on whether or not feed rollers 23 and 25 are being operated (and if so, in which direction) and whether or not boom 12 is being extended or retracted. This information may be measured or determined from the operational status of data processor 40. A first encoder may provide information to data processor 40 with respect to the direction of counter-rotation of feed rollers 23 and 25. A second encoder may provide information to data processor 40 with respect to the direction of movement of boom 12. In the alternative, the direction in which measuring wheel 34 is rotating may be determined by providing an encoder of the type that provides signals indicative of the direction of rotation of wheel 34. Thus, at any given time, data processor 40 may ascertain the direction in which tree 24 is moving relative to delimbing head 14. Data processor 40 may keep a record of the times at which the direction of movement of tree 24 changes.

Lengths along tree 24 may be calculated based on the number of rotations made by measuring wheel 34 in either direction. Data processor 40 records information on both the number of rotations carried out by measuring wheel 34 and the direction of travel of tree 24 relative to delimbing head 14 at any given time. Data processor 40 may therefore maintain a value for the length of tree 24 which has passed measuring wheel assembly 28 in either direction based on the formula:

$$\text{length} = 2\pi r (\text{number of rotations}) \quad (1)$$

wherein r is the radius 35 of measuring wheel 34 and the number of rotations in a given direction recorded by data processor 40.

Wiring and encoders of measuring wheel assembly 28 may be housed in protective casings (e.g. steel casings) to ensure that contact with branches of tree 24 do not damage or sever the wires, or damage the encoders. The encoders may also, or alternatively, be completely embedded in an electronic potting compound.

A tree-detecting mechanism is provided to detect tree 24 in tree guide tube 21. In the embodiment illustrated in FIG. 4B, the tree-detecting mechanism comprises a photoeye, herein referred to as short-eye 60. Short-eye 60 comprises a light source and a light detector. The light source emits a beam of light that is detected by the light detector unless an object, such as tree 24, blocks the light beam. Alternatively, the tree-detecting mechanism could comprise any suitable mechanism capable of detecting the presence of tree 24.

A second tree-detecting mechanism is positioned to detect the presence of a tree 24 at a fixed distance rearwardly from the first tree-detecting mechanism within tree guide tube 21. In the embodiment illustrated in FIG. 4B, the second tree-detecting mechanism comprises a photoeye, herein referred to as long-eye 62. Long-eye 62 may comprise a light source and light-detector which operate in substantially the same manner as the light source and detector of short-eye 60. Alternatively, the second tree-detecting mechanism could comprise any suitable mechanism capable of detecting the presence of tree 24.

Data processor 40 may provide input to a controller unit (not shown) that may be used to operate log feed roller mechanism 26, boom 12, and trimsaw 15, as described below. Data processor 40 or the controller unit may optionally provide output to a display means (not shown) so an operator may visually observe the display of information output by data processor 40.

Figure 4A:
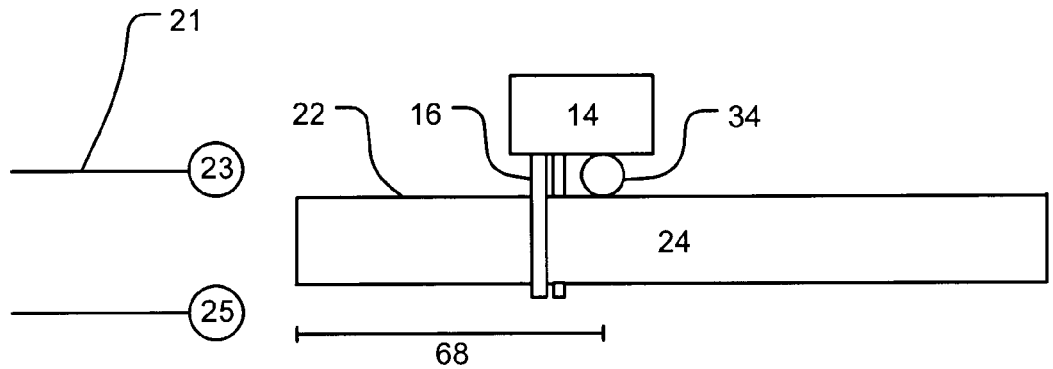
FIGS. 4A to 4C are schematic diagrams illustrating how the length of a tree is measured.
Figure 4B:
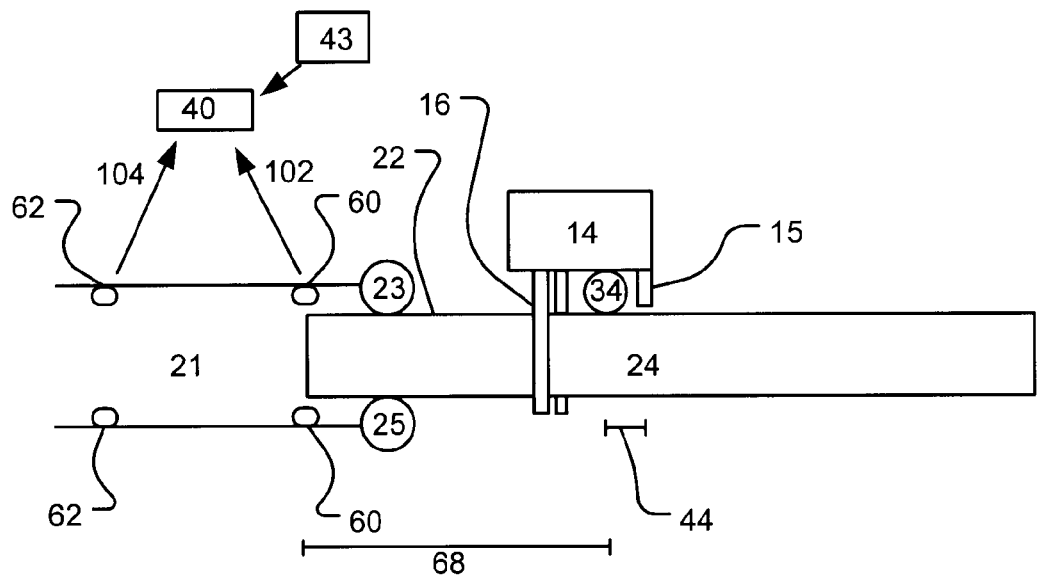

In operation, tree grapples 16 pick up a tree 24 near the butt of the tree as shown in FIG. 4A. Boom 12 is retracted to pull the butt of tree 24 rearwardly through opened log feed roller mechanism 26 into tree guide tube 21 until short-eye 60 is triggered, as shown in FIG. 4B. Alternatively, boom 12 is retracted to pull the butt of tree 24 up to log feed roller mechanism 26, and then feed rollers 23 and 25 grip and feed tree 24 rearwardly until short-eye 60 is triggered.

As shown in FIG. 4B, at the instant that short-eye 60 is triggered, the tree-detecting mechanism encodes a detectable change in a signal 102, which may be interpreted by data processor 40. The length by which boom 12 is extended relative to short-eye 60 is known, and this information is provided to data processor 40 by a suitable encoder 43. The length 68 by which the butt of tree 24 extends inwardly from measuring wheel 34 may therefore be determined by data processor 40 based on signal 102 and the known distance that boom 12 is extended at the time that signal 102 indicates that the butt of tree 24 has reached short-eye 60.

Once distance 68 is determined, data processor 40 begins recording the number of rotations made by measuring wheel 34 along tree surface 22 as feed rollers 23 and 25 feed tree 24 rearwardly into tree guide tube 21. In the process, tree 24 is delimbed by the delimbing knives of tree grapples 16. The forward-facing edge of delimbing head 14 may be equipped with a delimbing blade (not shown) that delimbs tree 24, enabling measuring wheel 34 to travel along delimbed portions of surface 22 of tree 24.

As tree 24 continues to be fed rearwardly into tree guide tube 21, the butt of tree 24 may eventually trigger long-eye 62 if tree 24 is of sufficient length. When tree 24 triggers long-eye 62, the second tree-detecting mechanism encodes a detectable change in a detection signal 104, which may be interpreted by data processor 40. A revised calculation of the tree length thusfar travelled by measuring wheel 34 may be determined by data processor 40 based on the known distance between long-eye 62 and measuring wheel 34. This revised calculation is useful because the measurement provided by measuring wheel 34 may sometimes include errors. Such errors may arise, for example, if tree 24 includes unusual surface features, such as knots, multiple limbs, and the like, or if measuring wheel 34 slips on surface 22 of tree 24. However, not all trees 24 are of sufficient length to be fed sufficiently rearwardly from measuring wheel 34 to reach long-eye 62.

At a certain point as tree 24 is being fed rearwardly into tree guide tube 21, trimsaw 15 will be activated to cut off a remaining portion of tree 24 that has not yet been delimbed. Trimsaw 15 maybe activated by the operator of delimber 10 or by the controller unit, for example, when delimbing head 14 approaches what is determined to be the commercially unusable top portion of tree 24, and/or when the diameter of the remaining portion of tree 24 approaching delimbing head 14 falls below a certain size.

Figure 4C:
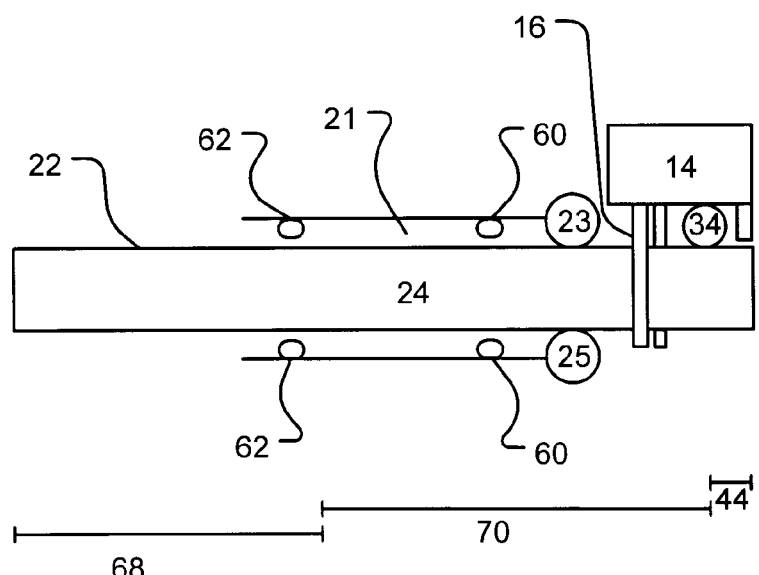

As shown in FIG. 4C the total length of delimbed tree 24 may be may be approximated as the sum of: a) length 68, earlier measured as the length between the butt of tree 24 and the point along tree 24 at which measuring wheel 34 contacts tree 24 when the butt of tree 24 triggers short-eye 60; and b) length 70 measured by measuring wheel 34 determined from Equation 1 and the number of rotations made by measuring wheel 34 between its initial position when short-eye 60 is triggered by the butt of tree 24 and its final position when trimsaw 15 is activated to cut off the remaining portion of tree 24 (with a portion of length 70 corrected by data processor 40 upon triggering of long-eye 62, if such corrected value was determined by data processor 40). In order to calculate a total length of tree 24, the approximate total length is adjusted by a correction factor of length 44, the known distance between the measuring wheel 34 and trimsaw 15 on delimbing head 14, in order to compensate for the fact that trimsaw 15 is positioned at a location different from measuring wheel 34. In the embodiment illustrated in FIG. 4C, trimsaw 15 is located forwardly of measuring wheel 34, and therefore length 44 must be added to the approximate total length to give the total length of delimbed tree 24.

Determination of the total length of delimbed tree 24 prior to cutting it into logs is beneficial in order to cut logs of lengths that minimize the amount of tree 24 that is wasted. Once the total length of delimbed tree 24 is determined, counter-rotation of feed rollers 23 and 25 may be used to advance tree 24 in the forward direction (FIG. 3B). Trimsaw 15 may be activated once specified lengths of tree 24 have been advanced beyond delimbing head 14 in order to cut tree 24 into logs of desired lengths. Measuring wheel 34 is used to provide information about the length by which tree 24 has advanced beyond trimsaw 15, as described below.

Figure 5A:
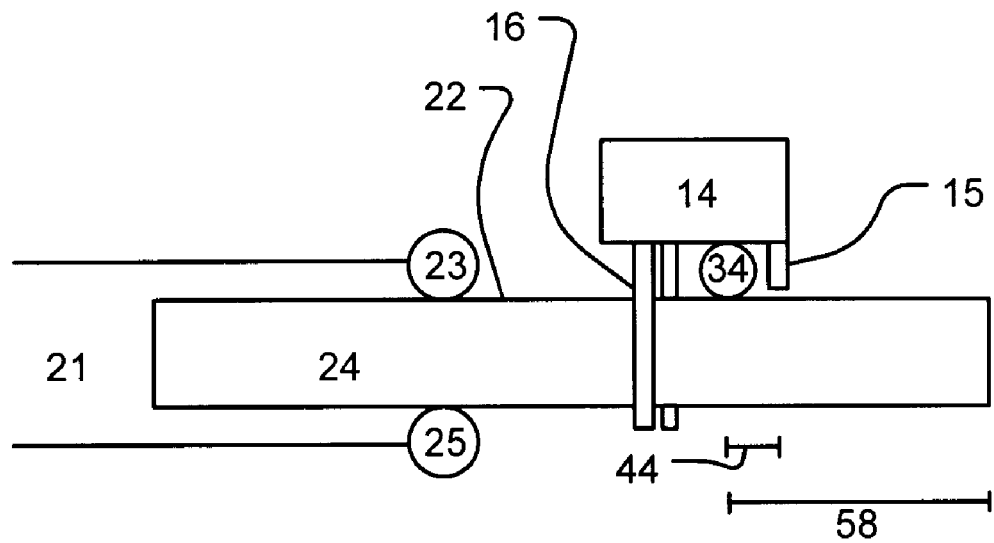
FIGS. 5A and 5B are schematic diagrams illustrating a delimbed tree being cut into logs of desired lengths.

With reference to FIG. 5A, length 58 by which tree 24 has been extended beyond measuring wheel 34 may be calculated by data processor 40 based on the number of rotations carried out by measuring wheel 34 in the counterclockwise direction and Equation 1. When a log is to be cut from tree 24, the desired log length must be corrected by a factor corresponding to length 44 between measuring wheel 34 and trimsaw 15 in order to compensate for the fact that trimsaw 15 is positioned at a location different from measuring wheel 34. In the illustrated embodiment, trimsaw 15 is positioned on the forward side of measuring wheel assembly 20. Therefore, distance 44 must be subtracted from the distance 58 by which tree 24 has been advanced past measuring wheel 34 to calculate the length of tree 24 extending beyond trimsaw 15. Once the desired log length has been extended beyond trimsaw 15, the controller unit may provide output to an operator, thereby signalling to the operator to activate trimsaw 15. Alternatively, the controller unit may emit a signal to automatically activate trimsaw 15 once the desired log length extends beyond trimsaw 15. This process may be repeated several times to cut delimbed tree 24 into several logs of desired lengths.

Figure 5B:
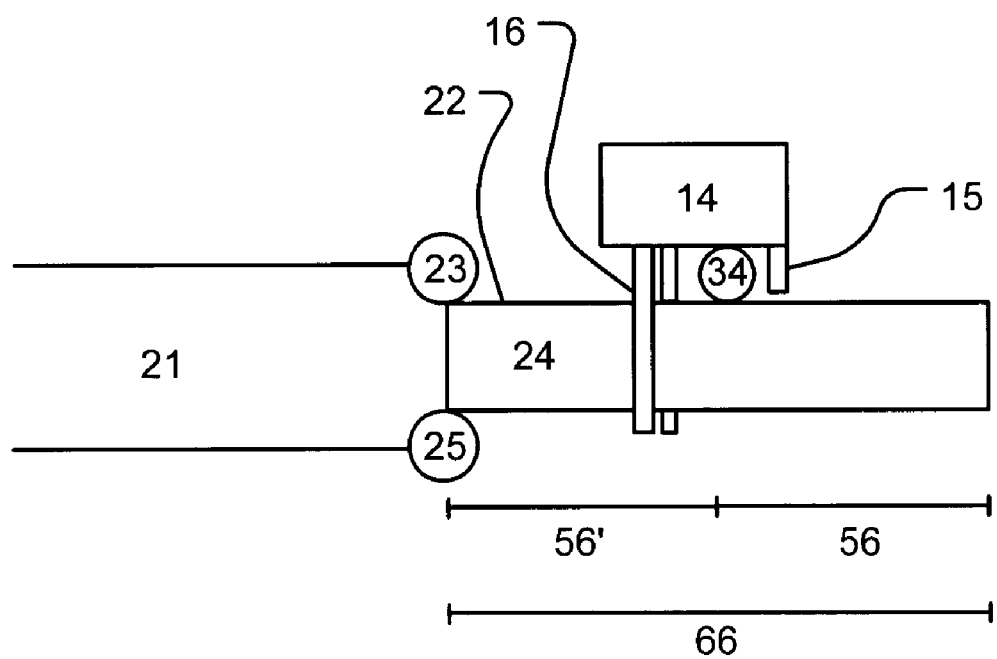

Once the butt of tree 24 reaches log feed roller mechanism 26, further forward advancement of tree 24 will not be possible. At this point, it will be necessary for data processor 40 to calculate the total length of tree 24 remaining, and to determine the position at which to cut tree 24 to produce two logs. The position at which tree 24 is cut is preferably a position which minimizes the amount of wood wasted by cutting logs somewhat longer than the required length. This situation is illustrated in FIG. 5B.

The length 66 of tree 24 remaining in delimber 10 at any time may be calculated by subtracting the total length of logs cut from tree 24 from the total length of tree 24 that was previously calculated. Once the remaining length 66 of tree 24 has been determined, data processor 40 may determine the preferred locations at which to cut tree 24 so as to produce logs of desired lengths 56 and 56'. Alternatively, the controller unit may display to an operator the length of tree 24 remaining in delimber 10, so that the operator may determine where tree 24 should be cut. Trimsaw 15 may be positioned by extension or retraction of boom 12 and/or by operating feed rollers 23, 25 such that the desired log length 56 extends beyond trimsaw 15. As a further alternative, tree 24 may be left uncut. The remaining length of tree 14 may then be removed from delimber 10 by the operation of tree grapples 16 and/or feed rollers 23, 25.

In some embodiments, the system for measuring the length of a tree may include a means for estimating the length of a tree based on its diameter. Such estimating means may include, for example, means for measuring a first diameter of tree 24 at the point positioned within the delimbing knives, and means for measuring a second diameter of tree 24 at the point positioned between feed rollers 23 and 25.

In one embodiment, the first diameter of tree 24 may be determined as follows. A gear is affixed to a rotating boss disposed on grapples 16. As the grapples open and close, the gear drives a pinion gear. The pinion gear may be maintained in contact with the gear by a cantilever arm applied by a rubber torsional spring, for example. Rotation of the pinion gear is recorded by an encoder which then provides a signal that is converted by a computer to a measurement of the distance between grapples 16, i.e., the first diameter of tree 24.

In one embodiment, the second diameter of tree 24 may be determined by as follows. Feed rollers 23 and 25 may be attached to chains connected to a rack and pinion gear. A spring connected to the rack gear biases feed rollers 23 and 25 toward a closed position. Opening of feed rollers 23 and 25 causes the chains to be pulled which, in turn drives the rack gear against the bias of the spring and rotates the pinion. An encoder records the number of rotations of the pinion gear and provides a signal that is converted to the distance by which feed rollers 23 and 25 opened. Additionally, as tree 24 passes through feed rollers 23 and 25, a taper ratio between second diameters along different points along tree 24 may be estimated. The first diameter can then be extrapolated from the taper ratio. The extrapolated first diameter can be compared against the measured first diameter to obtain more accurate estimates of the length and volume of tree 24.

When the first and second diameters are known, calculations based on known models that relate tree-diameter-length may be extrapolated to estimate the length of the tree. The models for calculating the tree diameter-to-length may be specific to a given species of tree, a given climate, or specific to any other variable that may alter the average diameter-to-length ratio of trees. The advantages of including means for estimating the length of a tree based on its diameter include the fact that such an estimate may serve as a check to confirm that the length of tree 24 measured by measuring wheel 34 is reasonably accurate. For example, large discrepancies between the estimated and measured length of tree 24 could indicate an error in the measurement of a particular tree. Such errors may arise, for example, where tree 24 includes an unusual shape or feature such as a knot, additional trunk, or the like, or where measuring wheel 34 slips in operation. Knowledge of the error in measurement based on the operation of measuring wheel 34 would allow correction of the error prior to cutting of tree 24.

Systems according to the invention may be configured to estimate the volume of wood processed by delimber 10. Knowledge of the length and diameter of logs cut from tree 24 allows for the calculation of the volume of wood processed by the delimber. An estimate of the volume of wood processed from any given tree may be calculated by data processor 40 based on the equation:

$$\text{volume} = \pi (\text{average radius})^2 (\text{length}) \tag{2}$$

wherein the average radius is calculated by taking the average of the first diameter and second diameter, and the total length of tree 24 is calculated as described above. The volume of wood processed by delimber 10 may be displayed on output means such as a visual display, printer mechanism, computer-readable file, or the like by data processor 40 or the controller unit.

Figure 6:
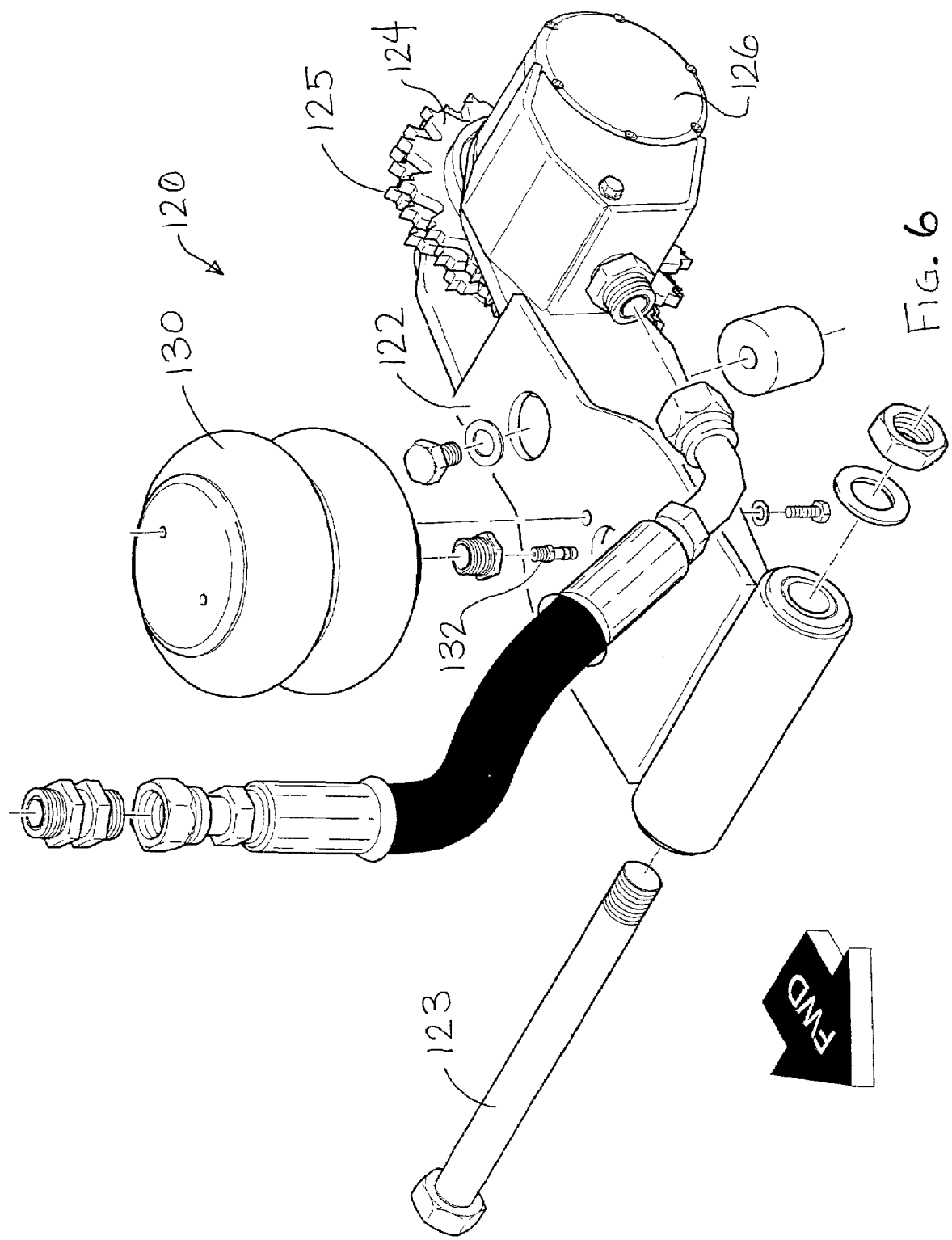
FIG. 6 is an exploded view of a measuring wheel assembly according to a specific embodiment of the invention.

FIG. 6 shows a measuring wheel assembly 120 according to a specific example embodiment of the invention. Assembly 120 comprises an arm 122 that can be pivotally mounted to a tree delimber or the like by way of a pin 123. A measuring wheel 124 has spikes 125 for engaging a surface of a log and is rotatably mounted at a distal end of arm 122. An encoder 126 measures rotation of measuring wheel 124.

An air bag 130 is coupled between arm 122 and the tree delimber (not shown in FIG. 6). Air bag 130 can be supplied with air or other pressurizing gas by way of valve 132. For example, air bag 130 may be filled with air at a pressure of 10 p.s.i. to 20 p.s.i. or so. The pressure within air bag 130 may be adjusted, for example with a pump, which could be a hand pump (not shown) to a pressure suitable to cause measuring wheel 124 to roll without slipping along logs being processed. The required pressure may depend to some degree on factors such as whether the surfaces of the logs being processed tend to be soft or hard.

While a number of exemplary aspects and embodiments have been discussed above, those of skill in the art will recognize certain modifications, permutations, additions and sub-combinations thereof. For example:

- trimsaw 15 may a chainsaw, a rotary saw or another type of saw suitable for cutting trees 24 to length;
- the outer circumferential edge of measuring wheel 34 may lack gripping features 36, and may instead comprise a suitable resilient material that will allow the motion of tree 24 to rotate measuring wheel 34, for example rubber or an elastomer;
- biasing means 33 may be any suitable linkage to keep wheel 34 in contact with tree 24, such as a coil spring, a leaf spring, a rotary spring, a hydraulic spring, a shock absorber, or the like. Biasing means 33 may be provided with a suitable tension adjustment means such as cam or linear tension adjustment mechanism, for example;
- the gear and pinion used to measure the first diameter may instead be a rack and pinion gear, a screw gear, chain and sprocket, or the like;
- the rack and pinion gear used to measure the second diameter may instead be a gear and pinion, a screw gear, chain and sprocket, or the like; or
- the encoders used to measure the first and second diameters may be rotational encoders or linear encoders.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for measuring the length of a tree being delimbed, the system comprising:
   a log feed roller mechanism operable to feed a tree into a tree guide along an axis;
   a delimbing head mounted for motion with respect to the log feed roller mechanism parallel to the axis;
   a measuring wheel resiliently mounted on the delimbing head;
   a tree-cutting device movable with the delimbing head;
   a first tree-sensing mechanism positioned to detect an end of the tree at a first location in the tree guide; and
   a data processing device connected to receive inputs from the measuring wheel, the first tree-sensing mechanism, and an encoder monitoring a position of the delimbing head, the data processing device configured to determine a net number of rotations of the measuring wheel and to calculate lengths of one or more portions of the tree based at least in part on the net number of rotations of the measuring wheel the position of the delimbing head and the input from the first tree-sensing mechanism;

wherein the system comprises a chamber containing a pressurized gas connected to bias the measuring wheel against the tree.

2. A system according to claim 1 comprising a second tree-sensing mechanism positioned to detect the end of the tree at a second location spaced apart from the first location along the tree guide.

3. A system according to claim 1 wherein the log feed roller mechanism comprises two rollers and an actuator coupled to press the rollers against the tree.

4. A system according to claim 1 wherein the first tree-sensing mechanism comprises a photoeye.

5. A system according to claim 3 wherein the data processing device is configured to determine a corrected value for one of the lengths in response to detection of the tree by the second tree-sensing mechanism.

6. A method according to claim 5 wherein the corrected value is based in part on a position of the delimbing head at a time when the tree is detected by the second tree-sensing mechanism.

7. A system according to claim 1 wherein the data processing device is configured to control the log feed roller mechanism and the motion of the delimbing head and to determine a direction of rotation of the measuring wheel based upon an operational state of the feed roller mechanism and delimbing head.

8. A system according to claim 1 wherein the measuring wheel is supported on an arm that is pivotally mounted to the delimbing head and the chamber is provided by an air bag coupled between the arm and the delimbing head.

9. A system according to claim 1 wherein the tree guide comprises a tube.

10. A system according to claim 1 wherein the data processing device is connected to receive diameter inputs representing diameters of the tree at a plurality of locations and is configured to compute a volume of wood processed based on the diameter inputs and calculated lengths.

11. A system according to claim 1 wherein the delimbing head is mounted at an end of a boom and the boom is slidably coupled to the tree guide.

* * * * *